(12) United States Patent
Andrews et al.

(10) Patent No.: US 6,522,878 B1
(45) Date of Patent: Feb. 18, 2003

(54) IN-BAND AUDIO SIGNALING

(75) Inventors: Joseph Andrews, San Marcos, CA (US); Todd H. Evans, San Diego, CA (US); Mark VanHoorebeke, Vista, CA (US); Lowell Campbell, Carlsbad, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/288,043

(22) Filed: Apr. 7, 1999

(51) Int. Cl.[7] .................................................. H04Q 7/20
(52) U.S. Cl. ..................... 455/425; 455/563; 455/226.4
(58) Field of Search ................................ 455/566, 568, 455/226.1, 226.2, 226.4, 67.7, 563, 425

(56) References Cited

U.S. PATENT DOCUMENTS

| | | | | |
|---|---|---|---|---|
| 5,630,205 A | * | 5/1997 | Ekelund | |
| 5,799,005 A | * | 8/1998 | Soliman | |
| 5,893,037 A | * | 4/1999 | Reele et al. | |
| 5,950,123 A | * | 9/1999 | Schwelb et al. | |
| 5,983,080 A | * | 11/1999 | Gerszberg et al. | ....... 455/226.2 |

* cited by examiner

Primary Examiner—Nguyen T. Vo
(74) Attorney, Agent, or Firm—Harness, Dickey & Pierce, PLC

(57) ABSTRACT

The vocoder in a digital cellular phone is used to create a status message indicating something that is happening in the cellular phone. That message can be noise, beeps, voice or other information. That information is played to the user to indicate the condition.

8 Claims, 2 Drawing Sheets

IN-BAND AUDIO SIGNALING

BACKGROUND

A user talking on a portable telephone often has relatively limited ability to watch indications on the display of the phone. For example, when the user is talking in the car, the user cannot pay attention to many additional variables. Such cellular phones typically have a display. However, when the phone is held up to the user's ear, the display cannot be watched.

Analog cellular phones inadvertently alert the user to low level of received radio signals. This is alerted by an increase in audio noise. However, digital phones maintain low noise audio until the moment when a call is dropped. Many users find this to be disconcerting. Phone users are often more comfortable with an audio indication of bad reception such as exists on an analog phone. This gives them a chance to plan mentally for the interruption of the call.

A digital phone user finds the received audio strength by looking at the signal strength indicator. This is usually a bar graph on the phone. This requires interrupting the conversation and moving the phone away from normal speaking position to view the display.

Other indications are similarly displayed on the display of the telephone.

SUMMARY

The present inventors recognize that the display of the telephone is often a bad place to put such information. This is because the user must interrupt the telephone conversation in order to see the display.

The present inventors also recognize that a digital phone, in which certain of these effects are more prevalent, already has certain hardware that could be used to at least partially deal with this issue. For example, digital telephones and especially CDMA telephones, already use voice coding techniques. The vocoder inherently has the ability to synthesize certain sounds and voices. The microprocessor is able to control such synthesis.

A first aspect of the present system is to use the received signal strength indicator to produce an audio signal generated by the vocoder in the telephone. This audio signal is mixed with the incoming voice, and presented to the user.

Another more general aspect is the control of this audio signal, by using the existing digital sound control device, which already controls reconstruction of digital voice communications, to create audio indications that are produced for the user to hear.

Yet another aspect includes different indicia being presented to the user through the audio telephone.

A specific aspect includes a cellular telephone system for in-band audio signaling, that has a controlling structure, including a user interface and a processor which processes commands from the user interface. A digital voice coding system, receiving information indicative of a cellular communication in digital voice form and converting said digital voice form to audio voice; and a status detection system, detecting a predetermined status to be indicated to a user, and commanding said digital voice coding module to provide an audio indication to the user indicative of said detected status.

DESCRIPTION OF THE EMBODIMENT

Figure 1:
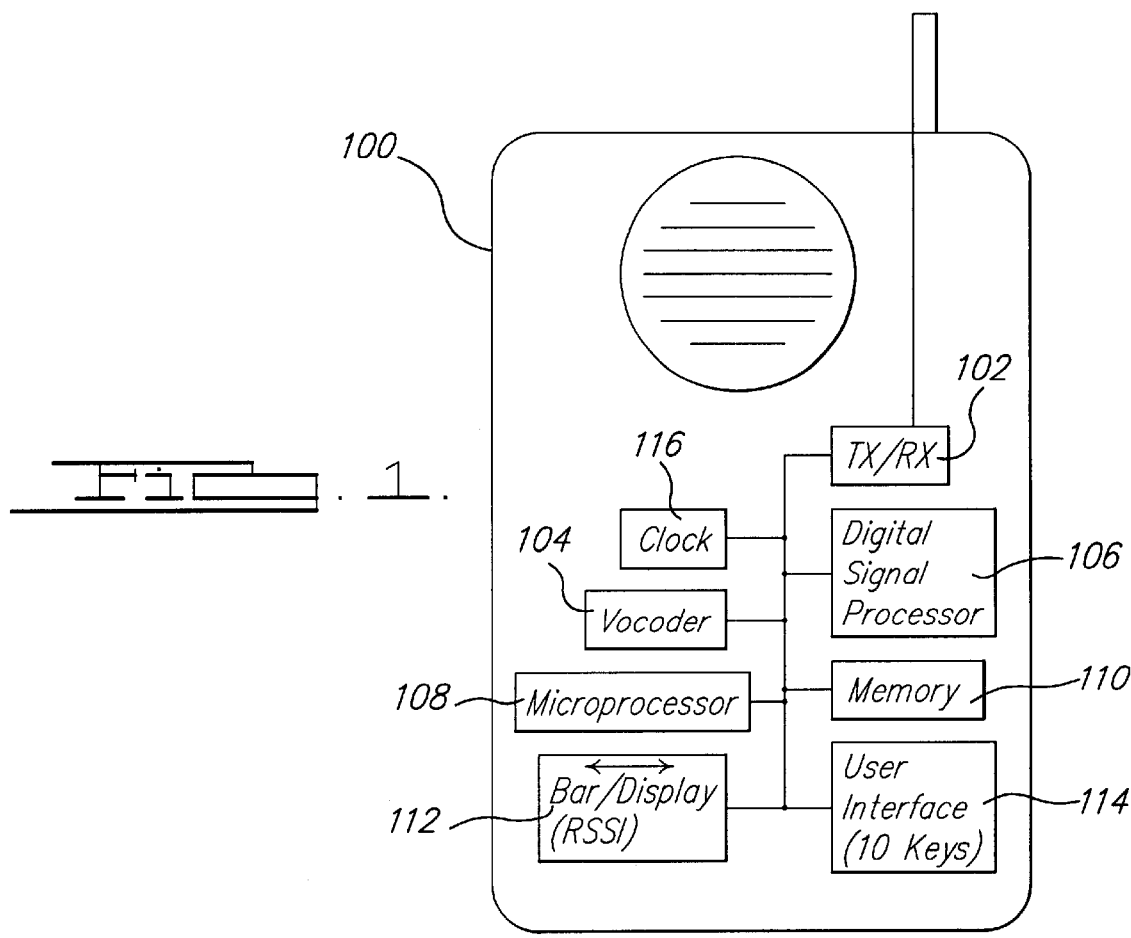
FIG. 1 shows a basic block diagram of the telephone.

A block diagram of the typical telephone is shown in FIG. 1. The cellular telephone 100 includes a cellular transceiver 102 interfacing with cellular electronics. The electronics includes the vocoder 104, digital signal processor 106, microprocessor 108, and other structure. The electronics is driven by a program stored in memory 110. In one embodiment, the telephone also includes a display 112 which displays certain status to the user. A user interface 114 allows the user to interact with the electronics.

Figure 2:
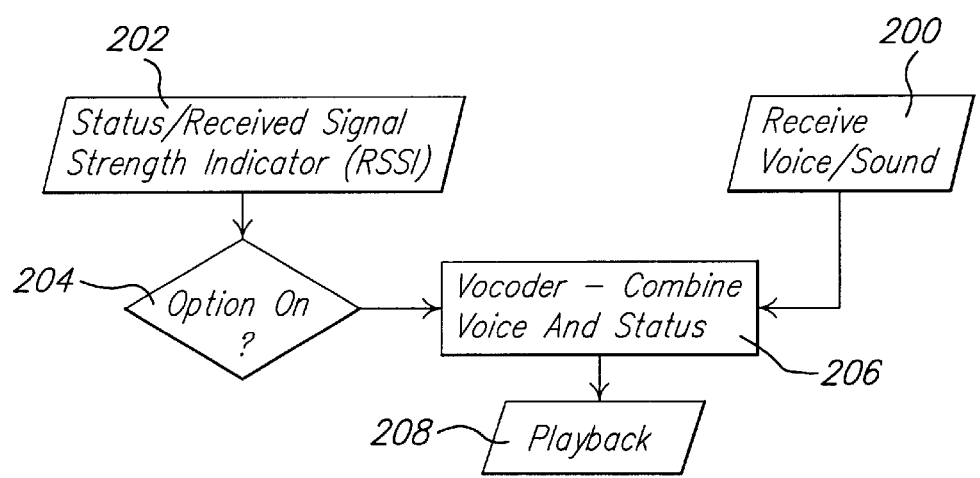
FIG. 2 shows a basic flowchart of the system.

The basic operation of the system is shown in FIG. 2. At step 200, the system receives voice and sound via the cellular network.

Step 202 is shown as a parallel step in which the status of the system, including various items of status that are described further herein and/or a received signal strength ("RSSI") indicator is received. Step 204 determines which options are enabled, and sets appropriate bits or flags in the program.

Figure 3:
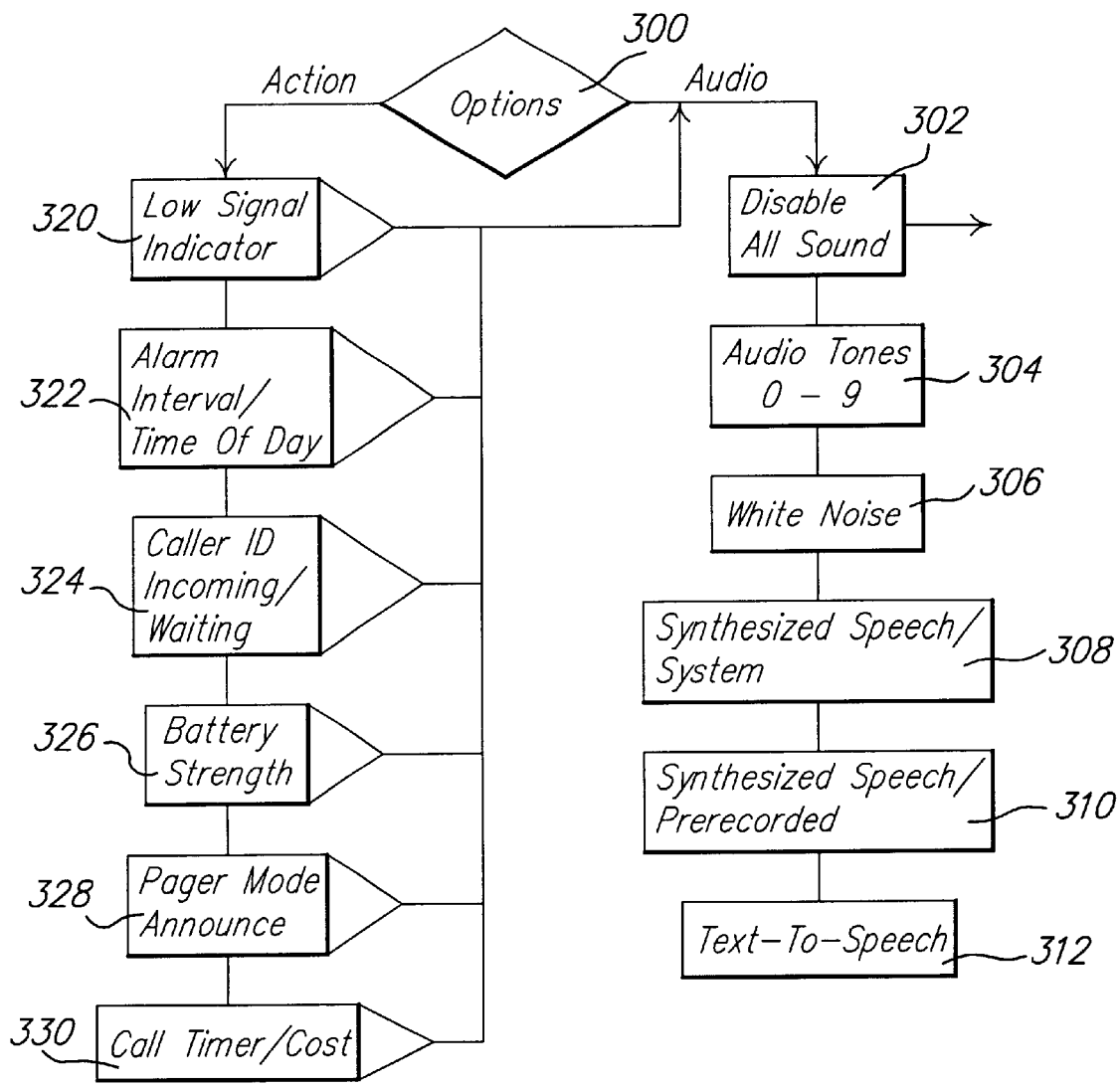
FIG. 3 shows a more detailed flowchart which shows both the options that give rise to an in-band audio system and the sounds which can be used as the in-band audio signals.

The detailed menu is shown in FIG. 3. The options include in-band audio options and action options. Audio options control what audio is generated for a specified action. This can include the following. All audio prompts can be disabled at 302. White noise, e.g. for low signal level, can be enabled at 306. Various audio tones 304 described further herein which are selected by numbers, including for example, beeps, bells, etc. Synthesized speech announcement can be selected at 308 using the synthesized voice of the system. Synthesized speech 310 can be selected using a prerecorded voice which can be the user's own voice, or text-to-speech 312. This system has special application for use by the sight-impaired and can be specially used with a speaker phone. The audio selected is generated from the already-existing vocoder 104 in the telephone. No hardware changes are required.

The "action" menu indicates when the prompts will be produced. Any one or more of these option actions can be selected. Each time that an option is selected, the system runs the audio-select menu to select the appropriate audio to be associated with that menu item.

At step 206, the vocoder combines the voice received at step 200 with the status indication that is obtained at step 202 based on the selection in step 204. The vocoder creates an audible indication based on the conditions and the parameters that are selected. Step 208 indicates playback of those audible indications along with the voices and sounds received via the cellular communication. The basic operation is shown in FIG. 3 in which a number of options can be selected at 320–330. Each option can be turned on or off. Once the option is turned on, the audio option select is run at 302–312. The selected option and sound(s) is stored in memory 110 at step 314.

The following status items represent the preferred items of status that are to be generated and played back at steps 206/208.

Variable Rate/Low Signal

The low level signal indicator is shown as 320.

In the known EVRC system and other variable rate systems, the cellular system can operate in one of a number of different bit-rate modes. Each mode operates at a different bit rate for the different operating situations. Typically, the one-eighth bit rate indicates that operating conditions are very poor. In this system, the status step at 202 detects that reception is low, e.g., below a specified threshold. The condition of the connection can also be ascertained from the received signal strength indicator. If either indication of bad signal strength is present, the system commands an indication of low reception to be generated.

A preferred sound option for this mode is white noise 306. This generates artificial white noise so that the user receiving the reception gets an indication that the call quality is poor and that the call may in fact be dropped.

Another option is to simply produce a beeping tone as one of the audio tones at 304. This beep is produced by the vocoder, The user hears the beep as part of the call. The beep indicates bad reception.

Another option is to implement the indicia using a synthesized voice. In this system, vocoder packets are stored indicative of the synthesized voice in the memory 110. Upon detecting the specified status, the vocoder packets are played back to the user. These vocoder packets indicate that the reception is bad. This is preferably done in a way such that the opposite party does not hear the tones; these tones are only heard by the owner of the telephone.

Alarm

The alarm is shown as 322. The cellular telephone typically includes a clock device 116 which may simply be a storage or reception element for a clock indication being received from the cellular system. According to one option, the status operation indicates intervals. This includes timing prompts received from the clock.

For example, when beeps (304) are selected, the timing clock provides beeps at each specified interval of time, e.g., 5–10 minutes. Voice (308) provides another timing prompt. This includes packets in the vocoder indicating, by voice, that a certain timing has passed.

Another status indication is for time of day. This could announce the certain specified times. For example, the system can provide multiple beeps indicating the time of day or can provide a synthesized voice indicating the time of day.

In the alarm mode, the user enters a specified alarm time via the user interface 114 to be stored in the memory 110. When the specified time occurs, the system announces that to the user. The announcing uses the selected sound, e.g., the vocoder to produce the selected audible cue. For example, the audible cues include beeps, bells, and a vocoder synthesized voice. At the specified time, the voice can say, "It's time for your appointment."

Caller ID

Many telephones include call waiting sounds that are provided to the user, so that the user can hear that another call is incoming. In this system, however, the user can receive not only that sound, but also others. A synthesized voice can indicate to the caller the ID number of the incoming call.

Typical telephones store books of telephone numbers corresponding with memory items in the memory. The user can use these items to look up, for example, a phone number for a person they know.

In this mode, if the telephone number is recognized as being in the database, the person's name can be converted to speech using a text-to-speech device and then can be enunciated to the user. Alternatively, or if the sound is not recognized, the vocoder can store packets indicating digits. This would require the vocoder to store ten packets indicating digits 0 through 9. The incoming caller ID is then enunciated as digits by the system. This provides the user with an indication of the incoming caller ID information.

As with other systems, the audio to be produced by vocoder 104 is selectable via the menu.

Battery

The battery strength can also be selected and controlled by enabling the battery strength option at 326. For example, in voice mode (308, 310) the system can enunciate when the battery is at half power, quarter power, and less.

In tone mode (304), the system provides distinctive tones indicating that the battery is at a prespecified amount.

Pager Message

Modern cellular telephones enable users to leave both numeric and alphanumeric, pages. Such a page is typically displayed on the display along with an audible alert.

If pager mode announce is selected at 328, the pager message, if alphanumeric, can be converted to sound using a text-to-speech converter, and read to the user via the vocoder. In a preferred mode, the text is also stored and displayed on the display so that the display maintains the text even after it is enunciated.

Call Timer/Cost

The cost per unit time for different calls can also be programmed into the telephone, or can be downloaded via the cellular network. Another option enables the user to obtain indications of the call cost at different times during the call. For example, the user can provide commands that the cost be read in specified increments, e.g., increments of $2.

The voice as described herein preferably uses a text-to-speech conversion program to drive the vocoder to produce speech based on the text. A dedicated hardware, e.g. a custom chip, circuit could alternately be used. In addition, the user has the capability of pre-recording speech (mode 310) and storing them in the memory. Then, many of these messages may be played back to the user in the user's own voice.

All of the sounds described herein preferably produce their sound using the vocoder. The tones are produced by sending parameters to the rate one-eighth vocoder. The voice can use higher rates, e.g., ¼ or ½ rate.

Also, while the preferred audio modes are described, the system could use any audio mode or multiple audio modes (e.g., voices and sound).

Although only a few embodiments have been disclosed in detail above, those with ordinary skill in the art certainly understand that modifications are possible in the preferred embodiment. All predictable modifications are intended to be encompassed within the following claims.

What is claimed is:

1. A cellular telephone system for in-band audio signaling, comprising:

a controlling structure, including a user interface and a processor which processes commands from said user interface;

a digital voice coding device, receiving information indicative of a cellular communication in compressed digital voice form and converting said digital voice form to audio; and a status detection system, detecting a predetermined status to be indicated to a user, and commanding said digital voice coding device to provide white noise combined with the audio to said user indicative of said predetermined status.

2. A system as in claim 1, further comprising a cellular transceiver element, said processor element responsive to said cellular transceiver element to detect a power level thereof, and wherein said white noise combined with the audio is indicative of said power level thereof.

3. A system as in claim 2, wherein the white noise combined with the audio is indicative of a reduced power level.

4. A system as in claim 3, wherein said white noise combined with the audio simulates poor call quality.

5. A system as in claim 4, wherein said poor call quality simulates a received analog signal at reduced power.

6. A system as in claim 1, wherein said digital voice coding device is a vocoder.

7. A system as in claim 1, wherein the predetermined status to be indicated to the user is a low bit rate.

8. A system as in claim 7, wherein the low bit rate is a one-eighth bit rate.

\* \* \* \* \*